(12) United States Patent
Maruo

(10) Patent No.: US 6,408,105 B1
(45) Date of Patent: Jun. 18, 2002

(54) METHOD FOR DETECTING SLOPE OF IMAGE DATA UTILIZING HOUGH-TRANSFORM

(75) Inventor: Kazuyuki Maruo, Tokyo (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 09/310,789

(22) Filed: May 12, 1999

(30) Foreign Application Priority Data

May 12, 1998 (JP) ............................................ 10-128768

(51) Int. Cl.[7] ................................................ G06K 9/36
(52) U.S. Cl. ........................ 382/281; 382/190; 382/199
(58) Field of Search ................................. 382/281, 168, 382/172, 266, 141, 171, 190, 191, 193, 194, 199, 201–204, 268, 269, 286; 701/28; 348/135

(56) References Cited

U.S. PATENT DOCUMENTS 5,629,989 A * 5/1997 Osada ......................... 382/281
5,825,915 A * 10/1998 Michimoto et al. ......... 382/154
5,832,138 A * 11/1998 Nakanishi et al. .......... 382/281
5,922,036 A * 7/1999 Yasui et al. .................... 701/28
6,111,993 A * 8/2000 Matsunaga ................... 382/281

OTHER PUBLICATIONS

Image Analysis Handbook, edited by Takagi and Shimoda, University of Tokyo Press, pp. 550–564, 1991.
Foundation of Image Recognition [II] written by Mori and Sakakura, Ohmsha, Ltd., pp. 3–19, 1990.

* cited by examiner

Primary Examiner—Bhavesh Mehta
Assistant Examiner—Kanji Patel
(74) Attorney, Agent, or Firm—Knobbe Martens Olson & Bear, LLP

(57) ABSTRACT

Image data is edge-processed and then digitized. This image data is Hough-transformed to generate a parameter plane in which multiple Hough-curves are plotted in a parameter space, from which coordinates with multiple intersected Hough-curves are extracted and grouped. For each group, representative coordinates are selected to estimate slopes of linear components in the image data. In this way, the linear components can be recognized from the image data to estimate the slope, thereby making it possible to modify slopes of linear components in image data of a semiconductor wafer taken at an arbitrary angle or the like.

24 Claims, 13 Drawing Sheets

IMAGE SPACE

PARAMETER SPACE

METHOD FOR DETECTING SLOPE OF IMAGE DATA UTILIZING HOUGH-TRANSFORM

BACKGROUND OF THE INVENTION

1. Field of the Invention

The present invention relates to a data processing method for recognizing linear components from image data to detect a slope thereof, and more particularly, to a data processing method for detecting a slope of image data in which multiple linear components exist in the same direction such as in a microscope photograph of an integrated circuit.

2. Description of the Related Art

Heretofore, in an inspection operation of a printed circuit board or a semiconductor circuit, defects or foreign matters, if generated on a surface of a sample, have been observed with a SEM (Scanning Electron Microscope) to take image data therefrom, which is then stored in a database. Such stored images of defects include multiple similar images.

Under present circumstance, when one attempts to compare an image of a certain sample during observation with a similar previous image, he must search various image data sequentially relying on his memory under the present conditions. Also, an image can be handled only by a person who took it because features of an image are difficult to express by words and it is hard to set a keyword for search, making it difficult to share data with another person. In order to overcome such problems, it is desired to efficiently search multiple image data.

There have been heretofore many various image processing methods for detecting, recognizing, and determining defects or foreign matters as mentioned above in image data taken from a printed circuit board or a semiconductor wafer with the SEM. These conventional methods typically employs digital image processing for digitally handling images, which is performed with data processing by a computer.

Heretofore, at image data search, a pattern matching technique has been primarily utilized in which an image under test is compared with a stored image. The comparison of images involves calculating differences between corresponding pixels in two images and generating a difference image which uses the differences as values of pixels.

If the two compared images are exactly the same, the difference image obtained through difference processing, which is a completely uniform image with the values of all pixels being 0. However, if the image under test involve defects or foreign matters, it shows that the different image contains pixels of the values other than 0 at portions corresponding to the defects or foreign matters.

Thus, when two images are to be compared for similarity, the total number of pixels having values other than 0 in the difference image is measured. If the resultant value is below a predetermined threshold, it can be determined that the compared two images are similar to each other, which is outputted as a detection result.

With the above-mentioned processing, only image data similar to a predetermined image can be extracted from multiple stored image data. In the case of an image of a semiconductor wafer, interconnect patterns run vertically and horizontally in a background portion, while with the interconnect pattern being usually aligned in an uniform direction systematically, the background portion is canceled in the pattern matching. This enables only a difference in particular portions such as defects or foreign matters to be extracted.

However, in order to favorably perform the aforementioned pattern matching, a plurality of image data need be matched in terms of positions and directions thereof. Even with data of images in which the same object is taken, the accuracy of pattern matching is extremely reduced if the images are taken at different positions and angles.

Thus, if multiple image data stored in a database, in terms of positions and angles are not matched, it is required to perform the pattern matching after the matching of positions or angles of the image data to be compared. However, this involves complicated operations and is not practical when multiple image data are searched at a higher speed.

The aforementioned database stores image data that each observe has taken images of semiconductor wafer, images are taken by observers in respectively optimal directions for analyzing detailed features of the defect. Thus, multiple image data do not match each other in terms of positions of directions thereof, thus making it difficult to perform a higher speed search of image data and extraction of different portions between image data with the pattern matching.

SUMMARY OF THE INVENTION

It is an object relate to the present invention to provide a data processing method capable of detecting slopes of linear components in image data.

In a first data processing method of the present invention, when image data comprising multiple pixels each having a multilevel value set in digital form is entered, the inputted image data is edge-processed to enhance values of the pixels in edge portions in the image data. The values of the pixels in the edge-processed image data are compared for each pixel with a predetermined threshold to convert the image data into binary data, and this binary image data is Hough-transformed to generate a parameter plane in which multiple Hough-curves are plotted in a parameter space. Coordinates at which a multiplicity of the Hough-curves intersect are extracted from the generated parameter plane through a comparison with a predetermined threshold, and these extracted coordinates in the parameter plane are grouped in accordance with the proximity of the coordinates. Representative coordinates are selected for each group thus generated, and slopes of linear components in the image data are estimated from the selected coordinates.

Thus, in the data processing method of the present invention, it is possible to detect a slope, for example, in an SEM image of a semiconductor wafer taken at an arbitrary angle because linear components can be recognized from digital image data to estimate a slope thereof.

In a second data processing method of the present invention, when image data comprising multiple pixels each having a multilevel value set in digital form and individually is inputted, the inputted image data is edge-processed to enhance values of the pixels in edge portions in the image data. The values of the pixels in the edge-processed image data are compared for each pixel with a predetermined threshold to convert the image data into binary data, and Hough-transform is performed for each pixel in the binary image data represented with position coordinates (x, y) to thereby generate a parameter plane which uses as its coordinates (θ, ρ) thereof in which θ represents an angle with respect to an x axis and |ρ| represents a distance from an origin point to a linear component ρ=x cos θ+y sin θ. Coordinates at which a multiplicity of the Hough-curves intersect are extracted from the generated parameter plane through a comparison with a predetermined threshold, and the number of the extracted coordinates in the parameter plane is added up for each angle θ to generate a histogram. An angle θ with the maximum number of the extracted coordinates is specified from the generated histogram.

Thus, in the data processing method of the present invention, it is possible to detect a slope, for example, in an SEM image of a semiconductor wafer taken at an arbitrary angle because linear components can be recognized from digital image data to estimate a slope thereof.

In a third data processing method of the present invention, when image data comprising multiple pixels each having a multilevel value set in digital form and individually is inputted, the inputted image data is edge-processed to enhance values of the pixels in edge portions in the image data. The values of the pixels in the edge-processed image data are compared for each pixel with a predetermined threshold to convert the image data into binary data, and Hough-transform is performed for each pixel in the binary image data represented with position coordinates (x, y) to thereby generate a parameter plane which uses as its coordinates (θ, ρ) thereof in which θ represents an angle with respect to an x axis and |ρ| represents a distance from an origin point to a linear component ρ=x cos θ+y sin θ. Coordinates at which a multiplicity of the Hough-curves intersect are extracted from the generated parameter plane through a comparison with a predetermined threshold, and this extracted coordinates in the parameter plane are grouped in accordance with the proximity of the coordinates. Representative coordinates are selected for each group thus generated, and an angle θ with a large number of the selected coordinates are concentrated is specified.

Thus, in the data processing method of the present invention, it is possible to detect a slope, for example, in an SEM image of a semiconductor wafer taken at an arbitrary angle because linear components are recognized from digital image data to output as data the angle of the slope thereof.

In a fourth data processing method of the present invention, when image data comprising multiple pixels each having a multilevel value set in digital form is inputted, the average of values of all the pixels in the inputted image data is calculated. A difference between the calculated average of values and a value for each pixel in the image data is calculated, and the calculated difference of the value is compared with a predetermined threshold for each pixel to convert to binary image data. The binary image data is Hough-transformed to generate a parameter plane in which multiple Hough-curves are plotted in a parameter space, and coordinates at which a multiplicity of the Hough-curves intersect are extracted from the generated parameter plane through a comparison with a predetermined threshold. The extracted coordinates in the parameter plane are grouped in accordance with the proximity of the coordinates, representative coordinates are selected for each group thus generated, and slopes of linear components in the image data are estimated from the selected coordinates.

Thus, in the data processing method of the present invention, it is possible to detect a slope, for example, in an SEM image of a semiconductor wafer taken at an arbitrary angle because linear components can be recognized from digital image data to estimate a slope thereof.

In a fifth data processing method of the present invention, when image data comprising multiple pixels each having a multilevel value set in digital form is inputted, the average of values of all the pixels in the inputted image data is calculated. A difference between the calculated average of values and a value for each pixel in the image data is calculated, and the calculated difference of the values is compared with a predetermined threshold for each pixel to convert the image data into binary data. Hough-transform is performed for each pixel in the binary image data represented with position coordinates (x, y) to thereby generate a parameter plane which uses as its coordinates (θ, ρ) thereof in which θ represents an angle with respect to an x axis and |ρ| represents a distance from an origin point to a linear component ρ=x cos θ+y sin θ. Coordinates at which a multiplicity of the Hough-curves intersect are extracted from the generated parameter plane through a comparison with a predetermined threshold, and the number of the extracted coordinates in the parameter plane is added up for each angle θ to generate a histogram. An angle θ with the maximum number of the extracted coordinates is specified from the generated histogram.

Thus, in the data processing method of the present invention, it is possible to detect a slope, for example, in an SEM image of a semiconductor wafer taken at an arbitrary angle because linear components are recognized from digital image data to output as data the angle of the slope thereof.

In a sixth data processing method of the present invention, when image data comprising multiple pixels each having a multilevel value set in digital form is inputted, the average of values of all the pixels in the inputted image data is calculated. A difference between the calculated average of values and a value for each pixel in the image data is calculated, and the calculated difference of the value is compared with a predetermined threshold for each pixel to convert the image data into binary data. Hough-transform is performed for each pixel in the binary image data represented with position coordinates (x, y) to thereby generate a parameter plane which uses as its coordinates (θ, ρ) thereof in which θ represents an angle with respect to an x axis and |ρ| represents a distance from an origin point to a linear component ρ=x cos θ+y sin θ. Coordinates at which a multiplicity of the Hough-curves intersect are extracted from the generated parameter plane through a comparison with a predetermined threshold, and this extracted coordinates in the parameter plane are grouped in accordance with the proximity of the coordinates. Representative coordinates are selected for each group thus generated, and an angle θ with a large number of the selected coordinates are concentrated is specified.

Thus, in the data processing method of the present invention, it is possible to detect a slope, for example, in an SEM image of a semiconductor wafer taken at an arbitrary angle because linear components are recognized from digital image data to output as data the angle of the slope thereof.

In a seventh data processing method of the present invention, when image data comprising multiple pixels each having a multilevel value set in digital form is inputted, the average M of values t of all the pixels in the inputted image data is calculated. A difference |t−M| between the calculated average of values and a value for each pixel in the image data is calculated as a weighting coefficient, and in Hough-transform for each pixel in the image data represented with position coordinates (x, y), for each intersection of Hough-curves the weighting coefficient corresponding thereto added to the number of the curves thereof to thereby generate a parameter plane which uses as its coordinates (θ, ρ) thereof in which θ represents an angle with respect to an x axis and |ρ| represents a distance from an origin point to a linear component ρ=x cos θ+y sin θ. Coordinates with a high value of the addition result from the parameter plane thus generated are extracted through a comparison with a predetermined threshold, and the extracted coordinates in the parameter plane are grouped in accordance with the proximity of the coordinates. Representative coordinates are selected for each group thus generated, and slopes of linear components in the image data are estimated from the selected coordinates.

Thus, in the data processing method of the present invention, it is possible to detect a slope, for example, in an SEM image of a semiconductor wafer taken at an arbitrary angle because linear components can be recognized from digital image data to estimate the slope thereof.

In a eighth data processing method of the present invention, when image data comprising multiple pixels each having a multilevel value set in digital form is inputted, the average M of values t of all the pixels in the inputted image data is calculated. A difference |t−M| between the calculated average of values and a value for each pixel in the image data is calculated as a weighting coefficient, and in Hough-transform for each pixel in the image data represented with position coordinates (x, y), for each intersection of Hough-curves the weighting coefficient corresponding thereto added to the number of the curves thereof to thereby generated a parameter plane which uses as its coordinates (θ, ρ) thereof in which θ represents an angle with respect to an x axis and |ρ| represents a distance from an origin point to a linear component ρ=x cos θ+y sin θ. Coordinates with a high value of the addition result from the parameter plane thus generated are extracted through a comparison with a predetermined threshold, and the number of the extracted coordinates in the parameter plane is added up for each angle θ to generate a histogram. An angle θ with the maximum number of the extracted coordinates is specified from the generated histogram.

Thus, in the data processing method of the present invention, it is possible to detect a slope, for example, in an SEM image of a semiconductor wafer taken at an arbitrary angle because linear components are recognized from digital image data to output as data the angle of the slope thereof.

In a seventh data processing method of the present invention, when image data comprising multiple pixels each having a multilevel value set in digital form is inputted, the average M of values t of all the pixels in the inputted image data is calculated. A difference |t−M| between the calculated average of values and a value for each pixel in the image data is calculated as a weighting coefficient, and in Hough-transform for each pixel in the image data represented with position coordinates (x, y), for each intersection of Hough-curves the weighting coefficient corresponding thereto added to the number of the curves thereof to thereby generate a parameter plane which uses as its coordinates (θ, ρ) thereof in which θ represents an angle with respect to an x axis and |ρ| represents a distance from an origin point to a linear component ρ=x cos θ+y sin θ. Coordinates with a high value of the addition result from the parameter plane thus generated are extracted through a comparison with a predetermined threshold, and the extracted coordinates in the parameter plane are grouped in accordance with the proximity of the coordinates. Representative coordinates are selected for each group thus generated, and an angle θ with a large number of the selected coordinates are concentrated is specified.

Thus, in the data processing method of the present invention, it is possible to detect a slope, for example, in an SEM image of a semiconductor wafer taken at an arbitrary angle because linear components are recognized from digital image data to output as data the angle of the slope thereof.

Incidentally, in a data processing method as mentioned above, it is also possible that a difference between the calculated average M of values of the pixels and a value for each pixel is calculated, a standard deviation E is calculated from the average M of values of pixels and the difference between the average and a value for each pixel, and a threshold t to convert the image data into binary data represented as "t=M+3Σ" is calculated from the average M and the standard deviation Σ.

In this case, a proper threshold is set to convert the image data into binary data so that the values of pixels in the image data can be properly digitized.

Additionally, in a data processing method as mentioned above, it is also possible that a difference between the calculated average Mp of values for all the coordinates in the parameter plane and each value for the coordinates is calculated, a standard deviation Σ is calculated using the average Mp of values and the difference between the average and each value for the coordinates, and a threshold Th to convert the image data into binary data represented as "Th=Mp+3Σ" is calculated from the average Mp and the standard deviation Σ.

In this case, a proper threshold is set to convert the image data into binary data so that coordinates can be properly extracted from the parameter plane.

Incidentally, as the above-mentioned edge-processing, the Sobel operator, the Roberts edge detection operator, or the like can be used, for example. In "Image Analysis Handbook" (edited by Takagi and Shimoda, University of Tokyo Press) pp.550–564, for example, an edge-processing method for image data is described in detail. Additionally, in "Foundations of Image Recognition [II]" (written by Mori and Sakakura, Ohmsha, Ltd.) PP 3–19, a processing method for Hough-transform is described in detail.

Any information storage medium may be used in the present invention as long as it has a program as software previously stored for causing a computer to perform various processing. For example, a ROM (Read Only Memory) or HDD (Hard Disc Drive) fixed in an apparatus having a computer as a part thereof, a CD (Compact Disc)-ROM (Read Only Memory) or FD (Floppy Disc) removably loaded in an apparatus having a computer as a part thereof, or the like may be used.

A computer used in the present invention may be any device capable of reading a program comprising software to perform a processing corresponding thereto, for example, a device having a CPU (Central Processing Unit) as a main unit and various devices connected thereto as required, such as a ROM, RAM (Random Access Memory), I/F (Interface), or the like.

The above and other objects, features and advantages relate to the present invention will become apparent from the following description with reference to the accompanying drawings which illustrate examples of the present invention.

DETAILED DESCRIPTION OF THE PREFERRED EMBODIMENTS

Figure 1:
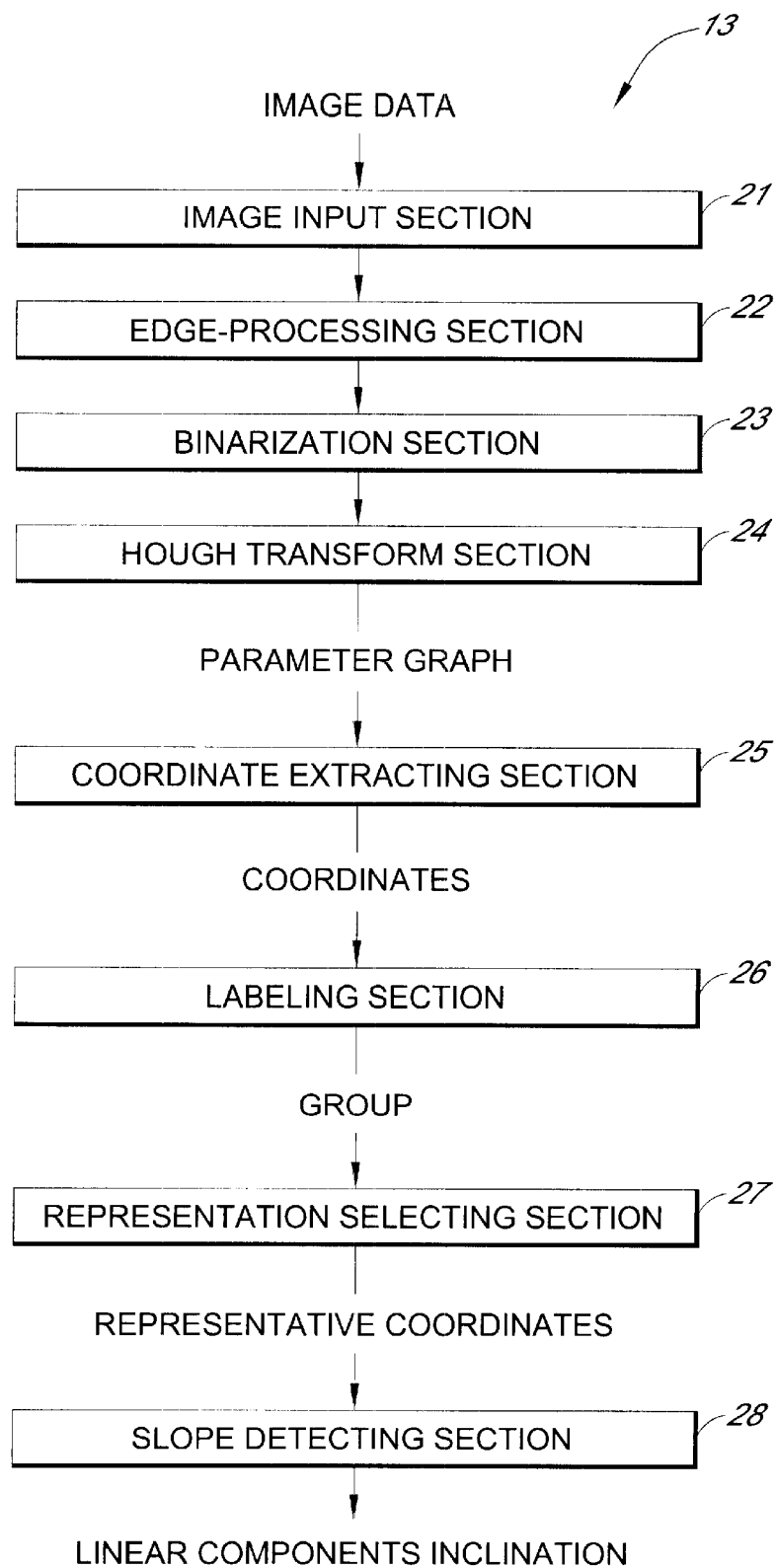
FIG. 1 is a schematic diagram showing a logical structure of a data processing apparatus of a first embodiment of the present invention.

A first embodiment relate to the present invention will be hereinafter described with reference to FIG. 1 to FIG. 7. Referring now to FIG. 3, data processing apparatus 1 relate to the present invention comprises a so-called personal computer and has CPU 101 as hardware forming a main unit of the computer.

This CPU 101 is connected to various devices such as ROM 103, RAM 104, HDD 105, FDD 107 loaded with FD106, CD drive 109 loaded with CD-ROM 108, key board 110, mouse 111, display 112, communication I/F 113, or the like through bus line 102.

In data processing apparatus 1 of the present invention, ROM 103, RAM 104, HDD 105, FD 106, and CD-ROM 108 correspond to information storage mediums which store programs and data required for various operations of CPU 101 as software.

For example, a control program which causes CPU 101 to perform various processing is pre-stored in FDD 106 or CD-ROM 108. Such software is pre-installed in HDD 105 and copied to RAM 104 at the starting of data processing apparatus 1 to be read by CPU 101.

Figure 2:
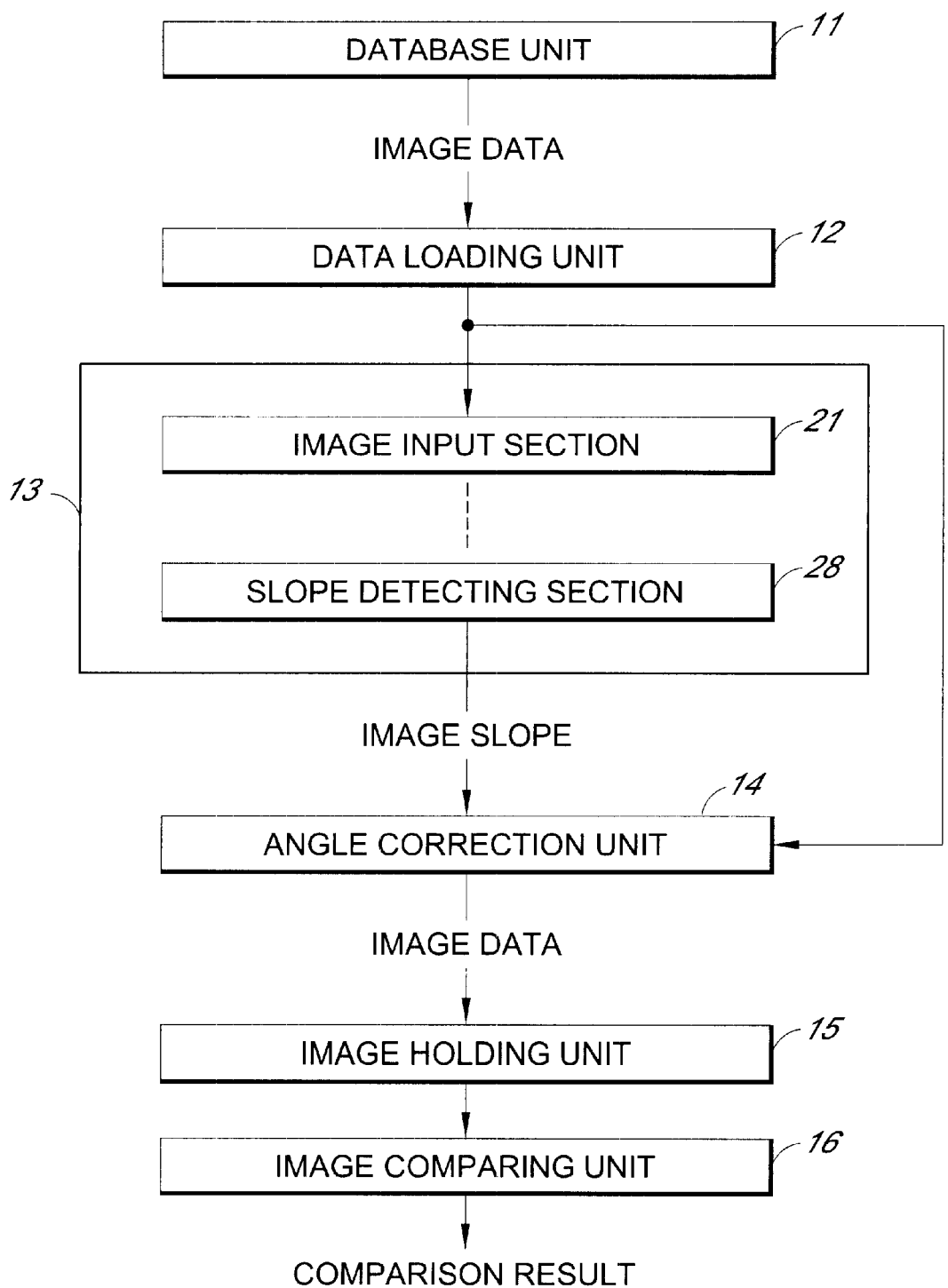
FIG. 2 is a schematic diagram showing a general logical structure of the data processing apparatus.
Figure 3:
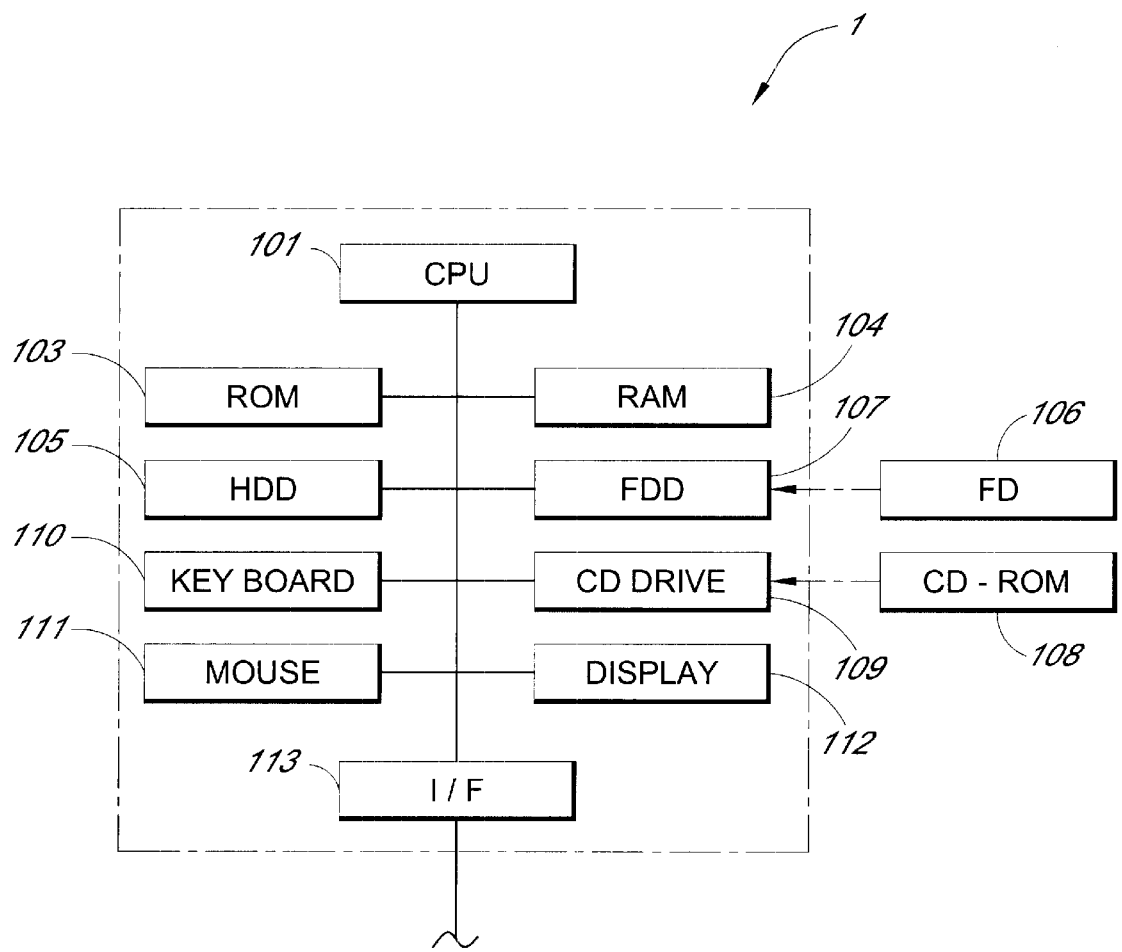
FIG. 3 is a block diagram showing a physical structure of the data processing apparatus.

CPU 101 thus reads a predetermined program to perform various processing, thereby logically implementing database unit 11, data loading unit 12, data processing unit 13, angle correction unit 14, image holding unit 15, and image comparing unit 16 in data processing apparatus 1 of this embodiment, as shown in FIG. 2.

Database unit 11 is constructed in a storage area of HDD 105 which is a large-capacity information storage medium and has multiple image data pre-stored as data files in digital form. Such image data comprises digital data for multiple pixels aligned vertically and horizontally. Respective pixel data have multilevel values set in digital form and individually.

For example, a separate SEM (not shown) is connected to communication I/F 113 of data processing apparatus 1, and image data taken with this SEM is applied to communication I/F 113 to be stored in database unit 11 of HDD 105 with the processing by CPU 101.

Data loading unit 12 loads image data from database unit 11 corresponding to predetermined conditions to supply the data to data processing unit 13, for example by CPU 101 performing predetermined processing corresponding to the control program set in RAM 104.

Similarly, by CPU 101 performing predetermined processing corresponding to the control program set in RAM 104, data processing unit 13 detects a slope in recorded images for the image data to provide it to angle correction unit 14 which causes the image data load from database unit 11 to be rotated in accordance with the detection result of data processing unit 13.

Image holding unit 15 corresponds to a predetermined storage area of an information storage medium such as RAM 104 and temporally holds the image data rotated by angle correcting unit 14. Image comparing unit 16 compares a plurality of image data held in image holding unit 15 to determine whether similarity is present or not by CPU 101 performing predetermined processing corresponding to the control program set in RAM 104.

The aforementioned data processing unit 13, as shown in FIG. 1, comprises image input section 21, edge-processing section 22, binarization section 23, Hough-transform section 24, coordinate extracting section 25, labeling section 26, representation selecting section 27, and slope detecting section 28.

The following various functions are also logically implemented by CPU 101 performing predetermined processing corresponding to the control program set in RAM 104. Image input section 21 receives image data applied from data loading unit 12 mentioned above.

Edge-processing section 22 edge-processes the image data applied to image input section 21 with "Roberts edge detection operator" to enhance the values of pixels in edge portions. Binarization section 23 compares a value of each pixel in the image data edge-processed by edge-processing section 22 with a predetermined threshold to convert the image data into binary data.

Hough-transform section 24 performs Hough-transform for the image data digitized by binalization section 23, and plots multiple Hough-curves in a parameter space to generate a parameter plane. Coordinate extracting section 25 adds up the number of intersected Hough-curves for all the coordinates in the parameter plane generated by Hough-transform section 24, and compares the resultant number with a predetermined threshold to thereby extract coordinates having multiple intersected Hough-curves.

Labeling section 26 groups the coordinates of the parameter plane extracted by coordinate extracting section 25 in accordance with the proximity of the coordinates. Representation selecting section 27 selects representative coordinates for each group generated by labeling section 26. Slope detecting section 28 estimates slopes of linear components in the image data from the coordinates selected by representation selecting section 27 to provide the estimated slope in the image data to the aforementioned angle correction unit 14.

Although the aforementioned respective portions 11 to 14, 21 to 28 are implemented utilizing hardware such as HDD 105 as required, the main portion thereof is implemented by the operation of CPU 101 which is a computer comprising hardware corresponding to the software stored in the information storage medium such as RAM 104.

Such software is stored in the information storage medium such as RAM 104 as a control program for causing CPU 101 to perform, for example, processing for storing inputted image data in HDD 105 in a predetermined format to construct database unit 11; processing for loading the image data from database unit 11; edge-processing the load image data to enhance the values of pixels in edge portions; processing for comparing a value of each pixel in the edge-processed image data with a predetermined threshold to convert the image data into binary data; processing for Hough-transform the binary image data to generate a parameter plane in which multiple Hough-curves are plotted in a parameter space; processing for extracting coordinates having multiple intersected Hough-curves from the parameter plane through a comparison with a predetermined threshold; processing for grouping the extracted coordinates in the parameter plane in accordance with the proximity of the coordinates; processing for selecting the representative coordinates for each group thus generated; processing for estimating a slope in the image data from the selected coordinates; rotating the image data load from database unit 11 in accordance with the estimated slope; processing for temporally holding the rotated image data in RAM 104; and processing for comparing a plurality of image data temporally held to determine whether similarity is present or not.

Figure 4A:
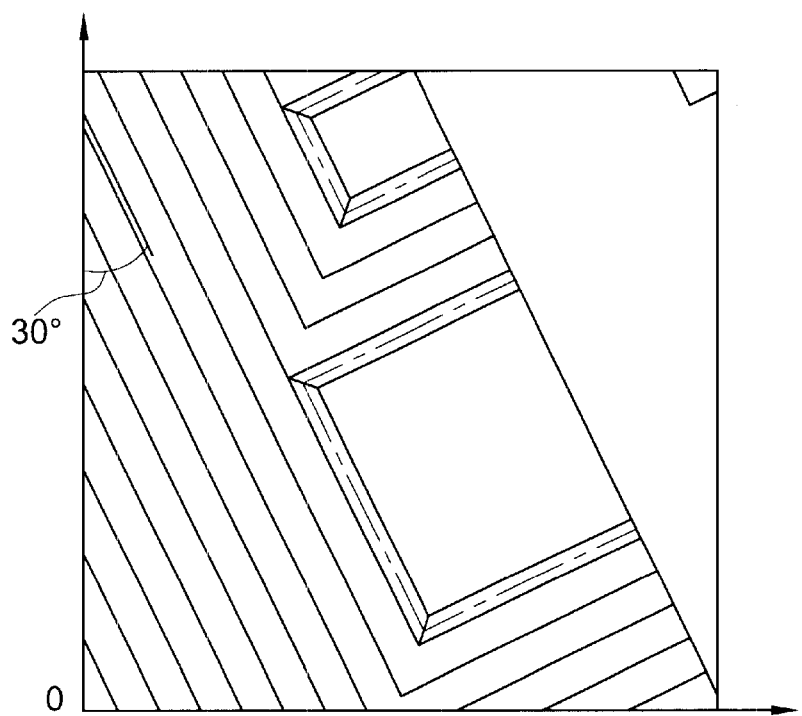
FIG. 4a is a schematic diagram representing image data so as to make taken substances clear with reference to an actual SEM photograph.

In a configuration as described above, data processing apparatus 1 of this embodiment has SEM photographs of a printed circuit board or a semiconductor wafer during the manufacturing process stored in database unit 11 as image data, as shown in FIG. 4*a*. For example, image data similar to desired image data can be retrieved from database unit 11.

In such a case, in data processing apparatus 1 of this embodiment, although a plurality of image data include images sloped at respective unique angles, the slopes are corrected and then a comparison is made to properly determine whether similarity is present or not. A data processing method of such data processing apparatus 1 will be hereinafter described.

First, image data previously stored in database unit 11 is load from data loading unit 12 and supplied to image input section 21. This image data is then edge-processed by edge-processing section 22 to enhance the values of pixels in edge portions.

Figure 4B:
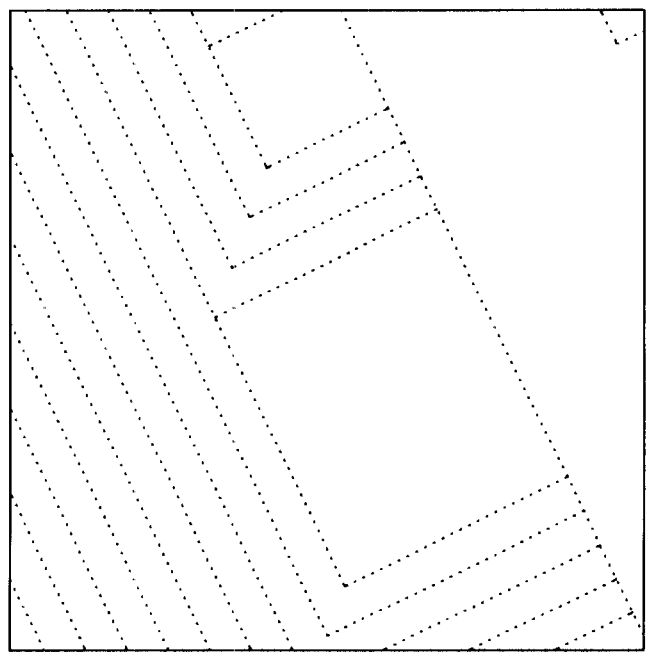
FIG. 4b is a schematic diagram showing image data which has been edge-processed and digitized.

As shown in FIG. 4*b*, a value of each pixel in the edge-processed image data is compared with a predetermined threshold by binarization section 23 to convert the image data into binary data. This binary image data is Hough-transformed by Hough-transform section 24 to generate a parameter plane. Here, the processing for generating the parameter plane from the binary image data through the Hough-transform will be hereinafter described in brief.

Figure 5:
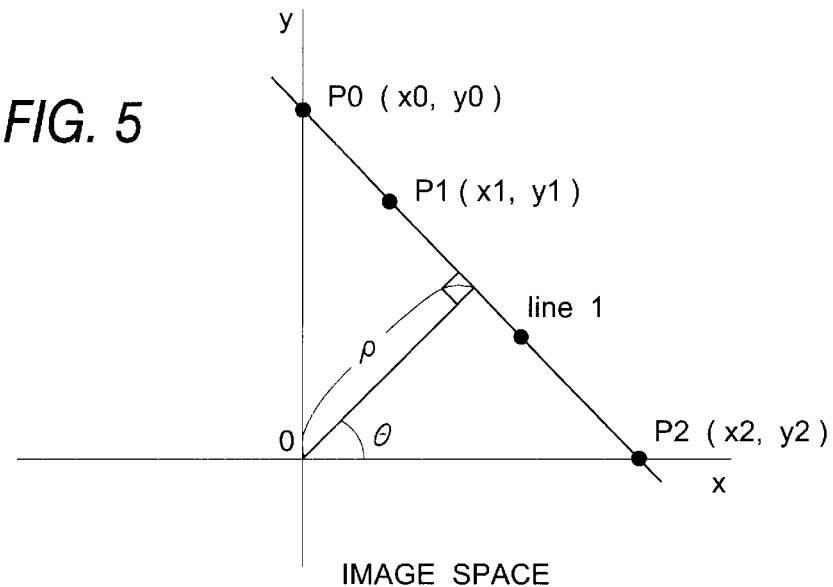
FIG. 5 is a schematic diagram showing a graph in which x/y axes are set for image data to assume linear components.

First, as shown in FIG. 5, when x/y axes are set for image data, an arbitrary line existing in the image data is represented as "$\rho = x \cos\theta + y \sin\theta$ ($0 \leq \theta \leq \pi$)" using an angle $\theta$ with respect to the x axis and a distance $|\rho|$ to an origin point as parameters ($\theta, \rho$). When an arbitrary pixel $P_i$ in the image data is assumed, all of lines passing coordinates ($x_i, y_i$) are represented as $\rho = x_i \cos\theta + y_i \sin\theta$.

Figure 6:
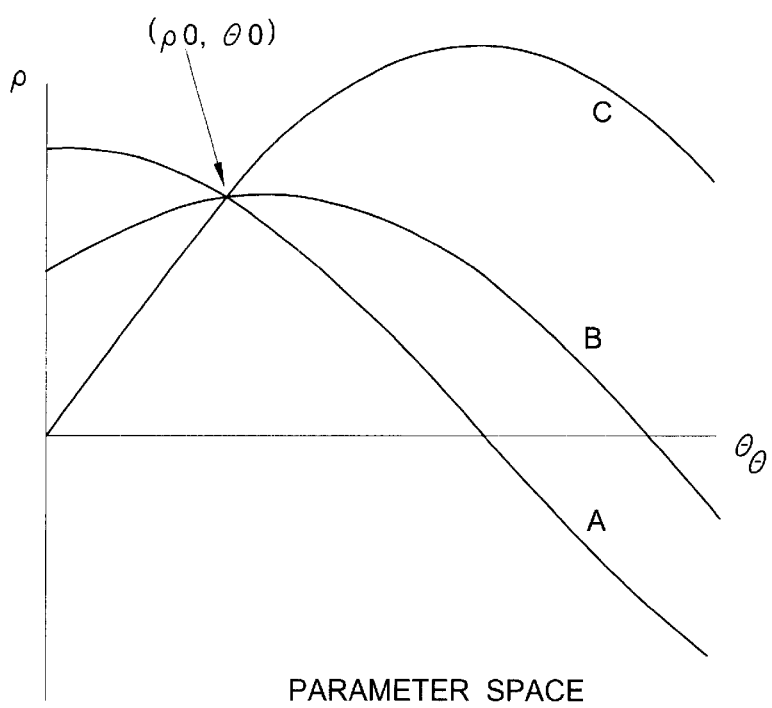
FIG. 6 is a schematic diagram showing a parameter plane generated from the linear components of the image data.

When all of lines passing one point in image data are represented with the parameters ($\theta, \rho$) in this way, Hough-curves having these parameters ($\theta, \rho$) as coordinates are plotted in a parameter space in which horizontal/vertical axes correspond to $\theta/\rho$ axes to thereby generate a parameter plane as shown in FIG. 6.

For example, as shown in FIG. 5, when attention is focused on one pixel $P_0$ on line 1 for image data, all of lines passing this point are represented as $\rho = x_0 \cos\theta + y_0 \sin\theta$ and Hough-curve A corresponding thereto is plotted in a parameter space as shown in FIG. 6.

Similarly, when any line passing second pixel $P_1$ on line 1 for image data is assumed, Hough-curve B corresponding thereto is also plotted in the parameter space. Two Hough-curves A, B plotted in the parameter space intersect at one point. This intersection point ($\theta_0, \rho_0$) corresponds to parameters which represent line 1 for image data.

Additionally, when Hough-curve C corresponding to third pixel $P_2$ on line 1 is plotted, three Hough-curves A to C intersect at one point ($\theta_0, \rho_0$) in the parameter space. In other words, when multiple Hough-curves are plotted in the parameter space for multiple pixels on one line for image data, the curves intersect at coordinates ($\theta_0, \rho_0$) corresponding to the parameters representing the line for image data, with the number of intersected curves being equal to the pixels on the line.

Thus, when Hough-curves are plotted in the parameter space with pixels which are candidates for linear components in the binary image data as mentioned above, multiple Hough-curves intersect at specific coordinates in the parameter space, which indicates the existence of a line in the image data for which the coordinates with the multiple intersected Hough-curves serve as parameters.

When the aforementioned approach is actually applied to image data in digital form, each time Hough-curves intersect at specific coordinates in the parameter space, the value of the coordinates is incremented by 1. For example, the value of coordinates through which no Hough-curve passes is a default value of 0, and the value of coordinates through which three Hough-curves pass is 3. Such processing is referred to as voting for a Hough-curve corresponding to coordinates (x, y) of a pixel.

In data processing apparatus 1 of this embodiment, when the parameter plane is generated form the binary image data through the aforementioned Hough-transform of Hough-transform section 24, the coordinates with multiple intersected Hough-curves are extracted from the parameter plane through a comparison with a predetermined threshold by coordinate extracting section 25.

Figure 7:
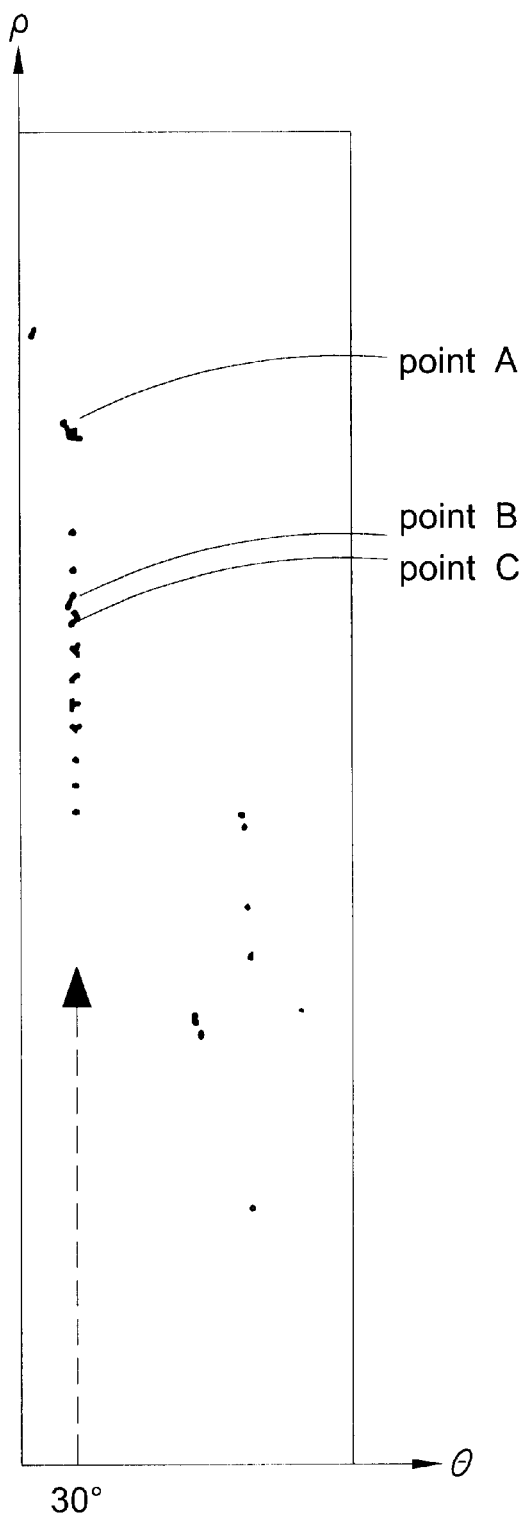
FIG. 7 is a schematic diagram showing extracted coordinates in the parameter plane.

Specifically, since the value of coordinates is added each time a Hough-curve passes it in the parameter plane as mentioned above, the resultant value of coordinates is compared with a predetermined threshold for all the coordinates in the parameter plane, thereby extracting the coordinates having multiple intersected Hough-curves with noise components filtered as shown in FIG. 7.

When a plurality of coordinates are extracted from the parameter plane in this way, these coordinates are grouped in accordance with the proximity thereof through labeling processing by labeling section 26. Thus, a plurality of coordinates located close to one another are integrated into one group.

Specifically, although a plurality of Hough-curves corresponding to one line for image data essentially pass coordinates at one point in a parameter space, the Hough-curves actually pass a plurality of coordinates with some deviations due to various errors. Such deviated coordinates are integrated into one group through the labeling processing.

In this labeling processing, for example, the parameter space is sequentially scanned to detect relative distances between extracted coordinates, and coordinates with a relative distance therebetween equal to or lower than a predetermined threshold are integrated into one group and labeled A, B, . . .

After groups are generated in the parameter plane as mentioned above, representative coordinates are selected by representation selecting section 27 for each group. For an approach for selecting the representative coordinates from a group in the parameter space, calculation of the barycenter (an average of coordinates θ/ρ) of all coordinates of a group, selection of coordinates with the highest value in a group, or the like are possible, for example.

After the representative coordinates are selected for each group in the parameter plane as mentioned above, the slope of linear components in image data is estimated from the coordinates by slope detecting section 28. For example, when a plurality of lines exist in image data, each of the lines individually correspond to each of a plurality of groups in the parameter plane. If the plurality of lines have the same direction, the plurality of groups have one angle parameter θ.

For an approach for estimating the slope of image data from the coordinates in the parameter plane, the angle parameter θ of the selected coordinates may be simply outputted as data, as in the invention described in claim 1, for example. However, if the selected coordinates have a plurality of angle parameters θ, it is preferable to specify an angle θ at which a multiplicity of the aforementioned coordinates are concentrated, as in the invention described in claim 3.

Data processing unit 13 of data processing apparatus 1 of this embodiment can estimate the slope of image data to output the angle as data as mentioned above. For example, in the case of the image data illustrated in FIG. 4a, the angle 30° is outputted as data based on the parameter plane shown in FIG. 7.

Additionally, in data processing apparatus 1 of this embodiment, when the angle of the slope of image data is detected by data processing unit 13 as mentioned above, the image data is rotated corresponding to this angle by angle correction unit 14 and then temporally held in angle holding unit 15. The temporally held image data are compared by image comparing unit 16 to determine whether similarity is present or not.

In short, data processing apparatus 1 of this embodiment can estimate the slope of image data as mentioned above, rotate the image data corresponding to the angle of the estimated slope, and determine similarity among a plurality of image data which have been thus corrected for the slope.

Thus, data processing apparatus 1 of this embodiment can classify multiple image data stored in database unit 11 in accordance with similarity and retrieve image data similar to desired image data from database unit 11.

Such a retrieval operation may be performed such that desired image data is applied to image input section 21, corrected for its angle by data processing unit 13 and then held in image holding unit 15, and multiple image data are sequentially load from database unit 11 by data loading unit 12 for a comparison by image comparing unit 16.

It should be noted that although the above-mentioned embodiment illustrates that all of a plurality of image data are corrected for the slope and then compared with one another, it is also possible that the angle of the slope in one reference image data serving as a search criterion is detected and then the angle of the slope of image data to be compared is detected, and only the image data to be compared is rotated such that the angle thereof matches the reference angle.

Additionally, although the above-mentioned embodiment illustrates utilization of SEM photographs of a semiconductor wafer during the manufacturing process as image data, the present invention is applicable to various image data in which a plurality of lines are aligned in the same direction.

For example, when an aerial photograph of urban areas having roads extending in systematic directions such as Kyoto is utilized as image data, the bearings of roads in the image data can be determined and the direction in which the image is taken can be determined from the bearings of the roads.

Furthermore, the above-mentioned embodiment illustrates that the respective portions of data processing apparatus 1 are logically implemented by CPU 101 operating in accordance with the control program stored in RAM 104 or the like as software. However, each of those portions may be formed as unique hardware. Alternatively, some of them may be stored in an information storage medium as software and others may be formed as hardware.

Also, the above-mentioned embodiment assumes that the software pre-installed from CD-ROM 108 or the like to HDD 105 is copied to RAM 104 at the starting of data processing apparatus 1 and CPU 101 reads the software stored in RAM 104. However, such software may be utilized by CUP 101 while it remains stored in HDD 105 or may be previously and fixedly stored in ROM 103.

In Addition, it is also possible to store software in FD 106 or CD-ROM 108, which is an information storage medium treatable on a standalone basis, to install the software from FD 106 or the like to HDD 105 or RAM 104. However, CPU 101 may directly read the software from FD 106 or the like to perform processing without such installation.

In other words, when the respective portions of data processing apparatus 1 relate to the present invention are implemented with software, any software can be employed as long as CPU 101 can read it to perform an operation corresponding thereto. Additionally, the control program for implementing the above-mentioned respective portions may be formed with a combination of a plurality of software. In such a case, only minimum software for implementing data processing apparatus 1 relate to the present invention may be stored in an information storage medium which is a standalone product.

For example, when data processing apparatus 1 equipped with an existing operating system is provided with an application software by means of an information storage medium such as CD-ROM 108, software for implementing the respective portions of data processing apparatus 1 relate to the present invention is implemented by a combination of the application software and the operating system so that the portion of the software dependent on the operating system may be omitted from the application software of the information storage medium.

Additionally, an approach for supplying CPU 101 with software described in an information storage medium is not limited to the direct loading of the information storage medium to data processing apparatus 1. For example, it is possible that the aforementioned software is stored in an information storage medium of a host computer which is connected to a terminal computer through a communication network, and the software is supplied from the host computer to the terminal computer through data communication.

In the case as mentioned above, although the terminal computer may perform standalone processing with the software downloaded to its own information storage medium, it is also possible that the processing is performed through real-time data communication with the host computer without downloading the software. In this case, the entire system in which the host computer is connected to the terminal computer through the communication network corresponds to data processing apparatus 1 of the present invention.

Figure 8:
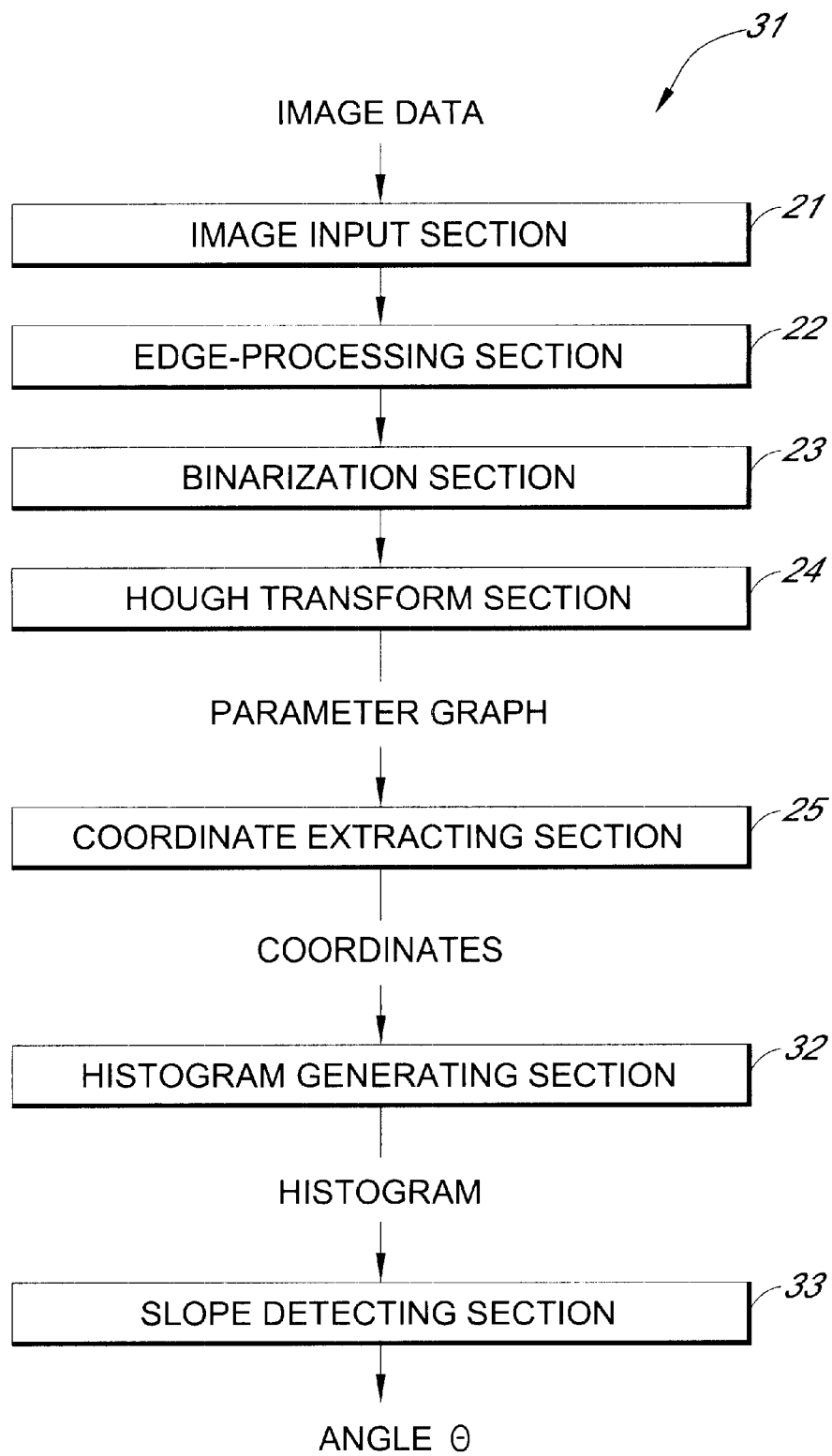
FIG. 8 is a schematic diagram showing a logical structure of essentials of a data processing apparatus of a second embodiment of the present invention.

Next, a second embodiment relate to the present invention will be hereinafter described with reference to FIG. 8 and FIG. 9. However, in the second embodiment, portions identical to those in the aforementioned first embodiment are designated with the same name and reference numbers and symbols, and detailed description thereof will be omitted.

A data processing apparatus (not shown) of this embodiment has a physical structure of hardware identical to that of the aforementioned data processing apparatus 1. As shown in FIG. 8, only a logical structure dependent on described contents of software is different between them.

Specifically, data processing section 31 of the data processing apparatus of this embodiment has respective sections 21 to 25 similarly to data processing section 13 of the aforementioned data processing apparatus 1. However, unlike the aforementioned data apparatus unit 13, data processing section 31 does not have labeling section 26 or representation selecting section 27 but has histogram generating section 32 and some of details on operations of slope detecting section 33 are different from that in the first embodiment.

Figure 9:
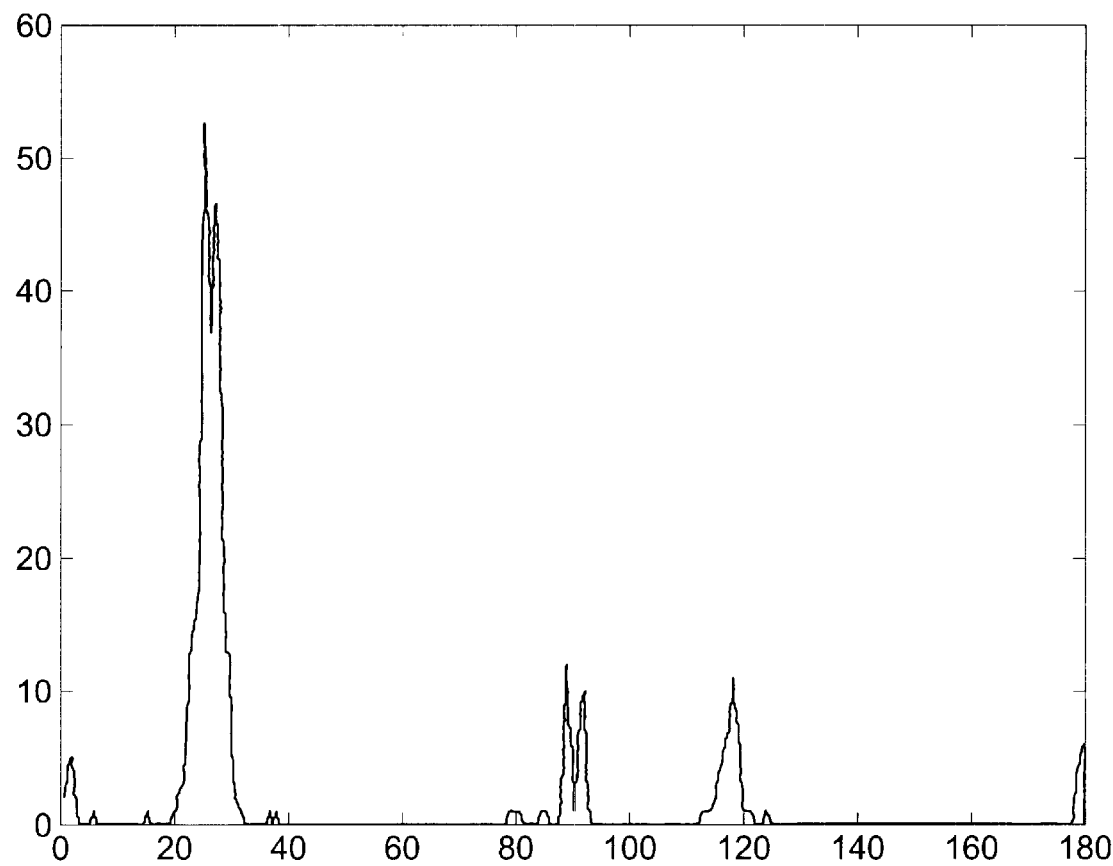
FIG. 9 is a schematic diagram showing a histogram.

Histogram generating section 32 adds up the number of coordinates in a parameter plane extracted by coordinate extracting section 25 for each angle θ to generate a histogram, as shown in FIG. 9. Slope detecting section 33 specifies the angle θ with the maximum number of coordinates from the histogram generated by histogram generating section 32.

In a configuration as mentioned above, a data processing method performed by data processing section 31 of this embodiment can also output as data an angle θ of a slope of image data similarly to data processing unit 13 of the aforementioned data processing apparatus 1. Thus, the image data can be rotated corresponding to the angle of the slope and similarity can be determined for a plurality of image data which have been corrected for the slope.

However, data processing section 31 of this embodiment does not perform processing for labeling and for selecting a representation. Instead, histogram generating section 32 adds up the number of coordinates in the parameter plane for each θ to generate the histogram from which slope detecting section 33 specifies the angle θ with the maximum number of coordinates.

In other words, data processing section 31 of this embodiment realizes functions similar to those of the aforementioned data processing section with a different approach. Since such approaches respectively have both advantages and disadvantages, selection is preferably made in consideration of various conditions such as specifications of an actual apparatus or features of image data.

Next, a third embodiment relate to the present invention will be hereinafter described with reference to FIG. 10 and FIG. 11. However, in the third embodiment, portions identical to those in the aforementioned first embodiment are designated with the same name and reference numbers and symbols, and detailed description thereof will be omitted.

Figure 10:
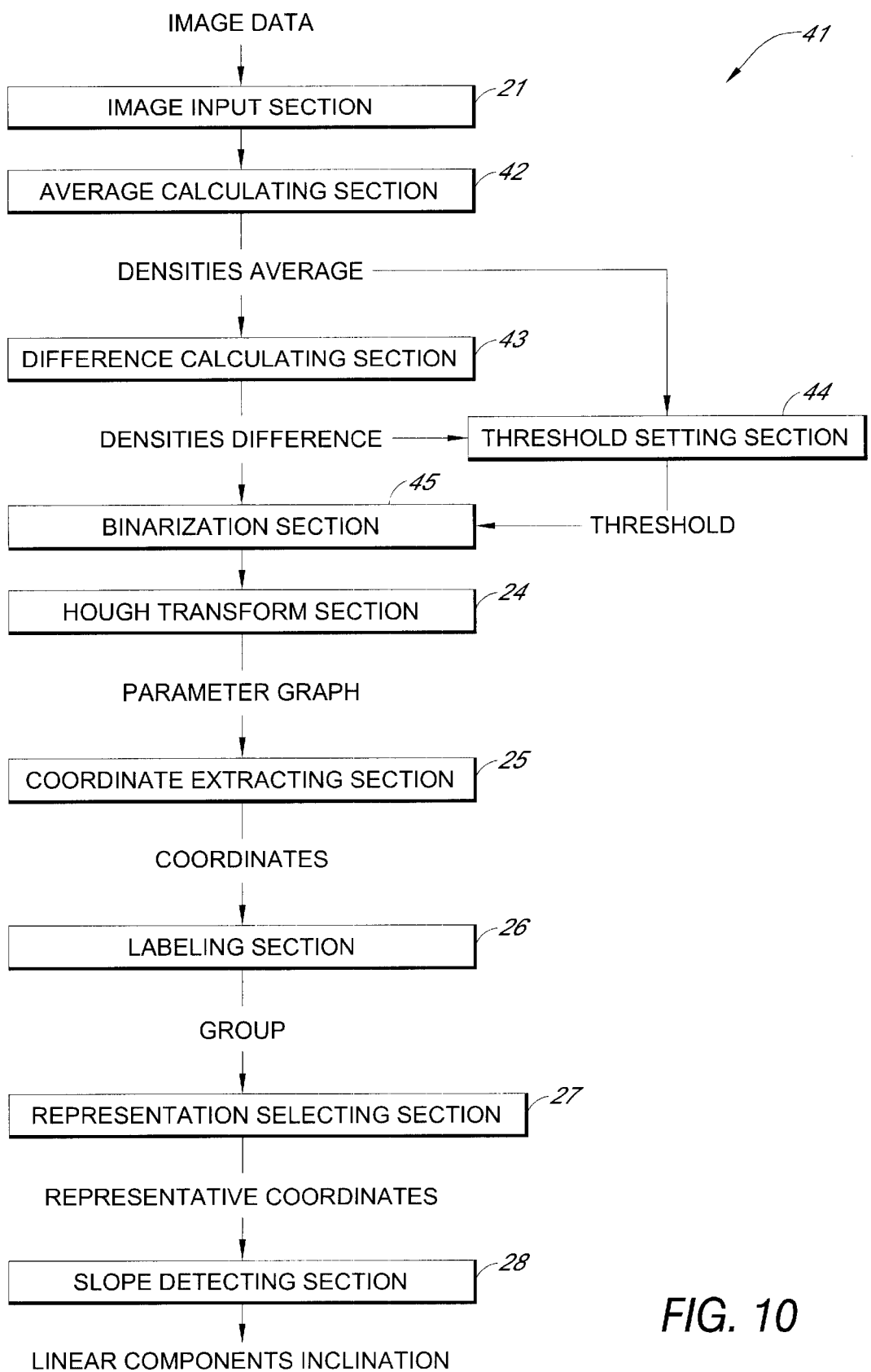
FIG. 10 is a schematic diagram showing a logical structure of essentials of a data processing apparatus of a third embodiment of the present invention.
Figure 11:
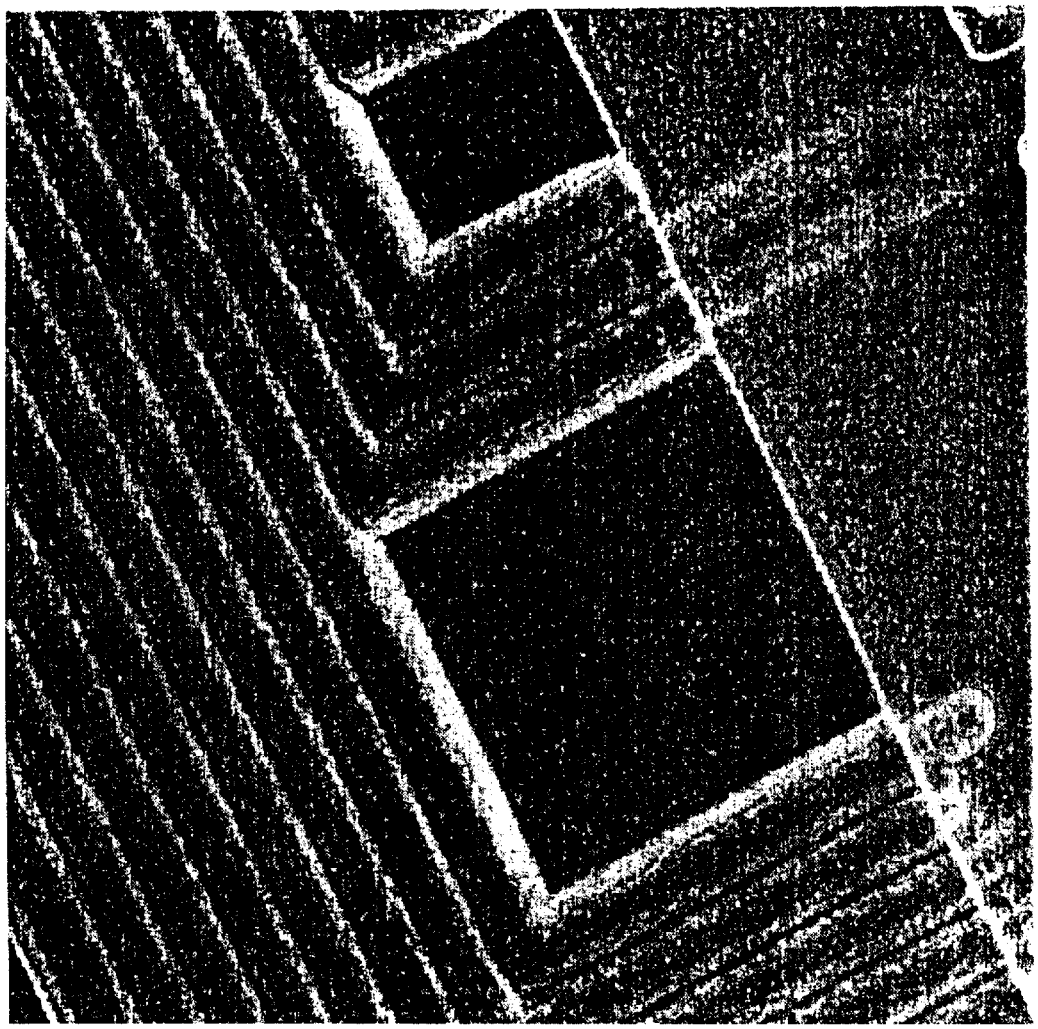
FIG. 11 is a schematic diagram showing digitized image data.

As shown in FIG. 10, data processing section 41 of this embodiment does not have edge-processing section 22 but has average calculating section 42, difference calculating section 43, and threshold calculating section 44, and some of details on the setting of binarization section 45 is different from that in the first embodiment.

Average calculating section 42 calculates the average of values of all pixels in image data applied to image input section 21. Difference calculating section 43 calculates the difference between the average of values calculated by average calculating section 42 and a value for each pixel in the image data to supply the calculated values to binarization section 45.

Threshold setting section 44 calculates a standard deviation Σ from the average M of values of pixels and the difference between the average and a value for each pixel to calculate a threshold t represented as "t=M+3Σ" for setting in binarization section 45. Binarization section 45 then compares the difference between the average of values and a value for each pixel calculated by difference calculating section 43 with the threshold t set by threshold setting section 44 to digitize the image data as shown in FIG. 11.

In a configuration as mentioned above, data processing section 41 of this embodiment also realizes functions similar to those of the aforementioned data processing unit 13 with a different approach. Specifically, unlike the aforementioned data processing unit 13, data processing section 41 does not perform edge-processing for image data but calculates the average of values of all pixels in image data by average calculating section 42 to calculate the difference between the average and a value for each pixel in the image data by difference calculating section 43.

From the average M of values of pixels and the difference between the average and a value for each pixel, calculated as mentioned above, threshold setting section 44 calculates the standard deviation Σ to derive the threshold t represented as "t=M+3Σ" which is set in binarization section 45. Binarization section 45 compares the difference between the average of values and a value for each pixel with the predetermined threshold t to digitize the image data.

The binary image data is Hough-transformed to generate a parameter plane. Then, extraction of coordinates with multiple intersected Hough-curves, grouping of the coordinates through labeling processing, selection of representative coordinates for each group, and estimation of the slope of the image data are sequentially performed.

Figure 12:
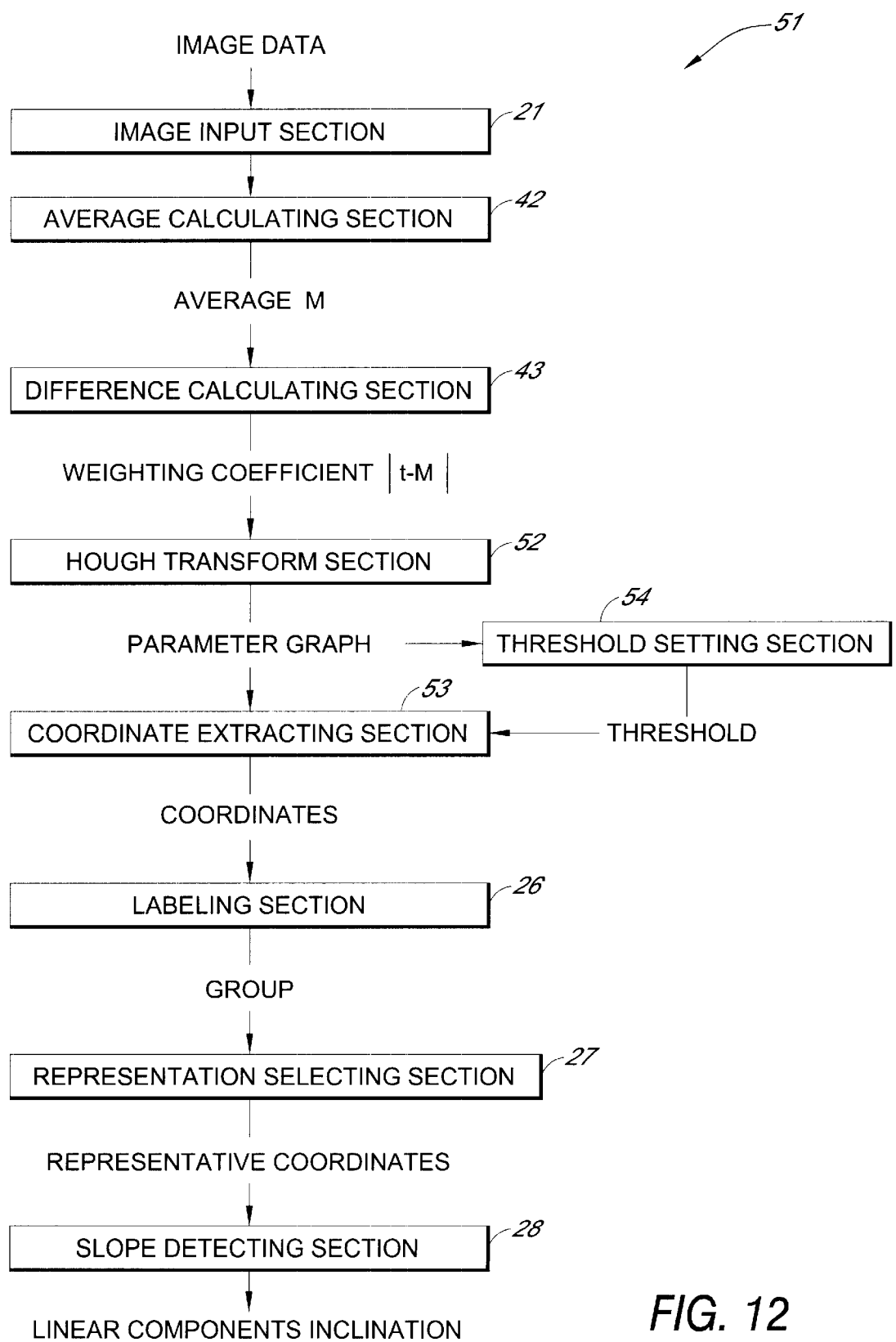
FIG. 12 is a schematic diagram showing a logical structure of essentials of a data processing apparatus of a fourth embodiment of the present invention.

Next, a fourth embodiment relate to the present invention will be hereinafter described with reference to FIG. 12. However, in the fourth embodiment, portions identical to those in the aforementioned third embodiment are designated with the same name and reference numbers and symbols, and detailed description thereof will be omitted.

Although data processing section 51 of this embodiment also has average calculating section 42 and difference calculating section 43, some of details on the setting of Hough-transform section 52 and coordinate extracting section 53 are different from those in the third embodiment. Data processing section 51 does not have binarization section 45 interposed between difference calculating section 43 and Hough-transform section 52, and threshold setting section 54 is logically linked to Hough-transform section 52 and coordinate extracting section 53.

Average calculating section 42 calculates the average M of values t of all pixels in image data. Difference calculating section 43 calculates a difference |t−M| between the average M and a value for each pixel in the image data as a weighting coefficient.

Hough-transform section 52 performs Hough-transform for each pixel in image data which is not digitized. In this Hough-transforming, each time Hough-curves intersect, the weighting coefficient corresponding thereto added to the number of the curves thereof. Specifically, in the aforementioned original Hough-transforming, each time Hough-curves intersect, the value for the coordinates corresponding to the intersection is incremented by 1 (voting for Hough-curves). In this Hough-transform processing, however, each time Hough-curves intersect, the corresponding weighting coefficient |t−M| is added.

Coordinate extracting section 53 extracts coordinates with a high value of the addition result from a parameter plane generated by Hough-transform section 52 through a comparison with a predetermined threshold. This threshold is set by threshold setting section 54. Threshold setting section 54 calculates the average Mp of values for all coordinates in the parameter plane and a standard deviation Σ for values of coordinates to set a threshold Th represented as "Th=Mp+3Σ" in coordinate extracting section 53.

In a configuration as mentioned above, data processing section 51 of this embodiment detects a slope without digitizing image data. Specifically, the average M of values t of all pixels in image data is calculated by average calculating section 42 and the difference |t−M| between the average M and a value for each pixel in the image data is calculated by difference calculating section 43 as a weighting coefficient.

In the Hough-transform performed for each pixel in image data by Hough-transform section 52, for each intersection of Hough-curves, a corresponding weighting coefficient |t−M| is added to generate a parameter plane from which coordinates with a high value of the addition result are extracted by coordinate extracting section 53.

By utilizing the value of pixels to generate the weighting coefficient as mentioned above, a parameter plane can be generated to extract coordinates without digitizing image data. The threshold Th for extracting coordinates is set by threshold section 54 as "Th=Mp+3Σ" from the average Mp of values for all coordinates in the parameter plane and the standard deviation Σ for values of coordinates so that coordinates corresponding to linear components in image data can be favorably extracted from the parameter plane.

Figure 13:
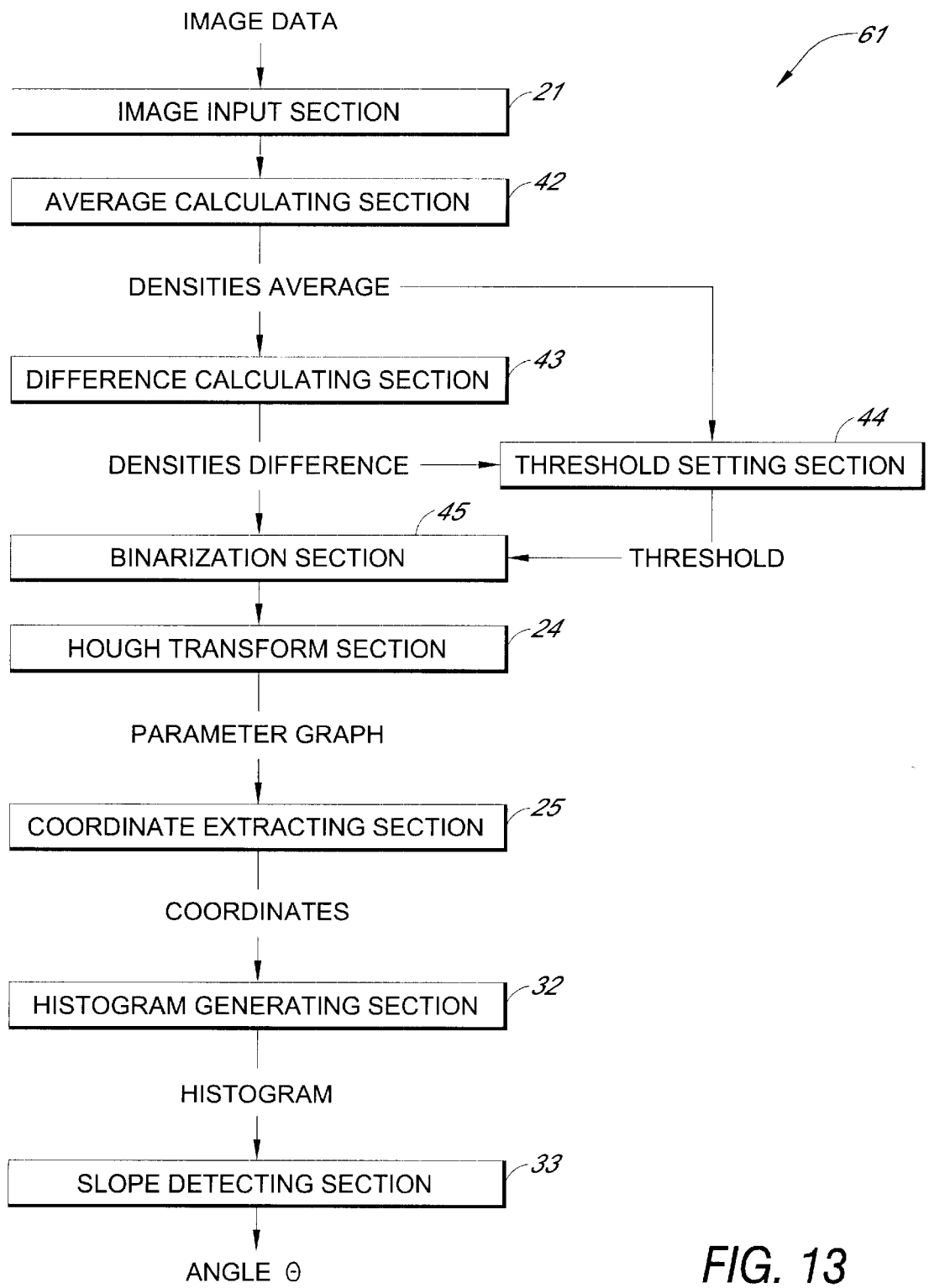
FIG. 13 is a schematic diagram showing a logical structure of essentials of a data processing apparatus of a first variation of the present invention.

It should be noted that the aforementioned various embodiments can be freely combined. For example, as data processing unit 61 of a first variation shown in FIG. 13, respective portions 42 to 45 of the aforementioned third embodiment can be combined with respective portions 32, 33 of the aforementioned second embodiment.

Figure 14:
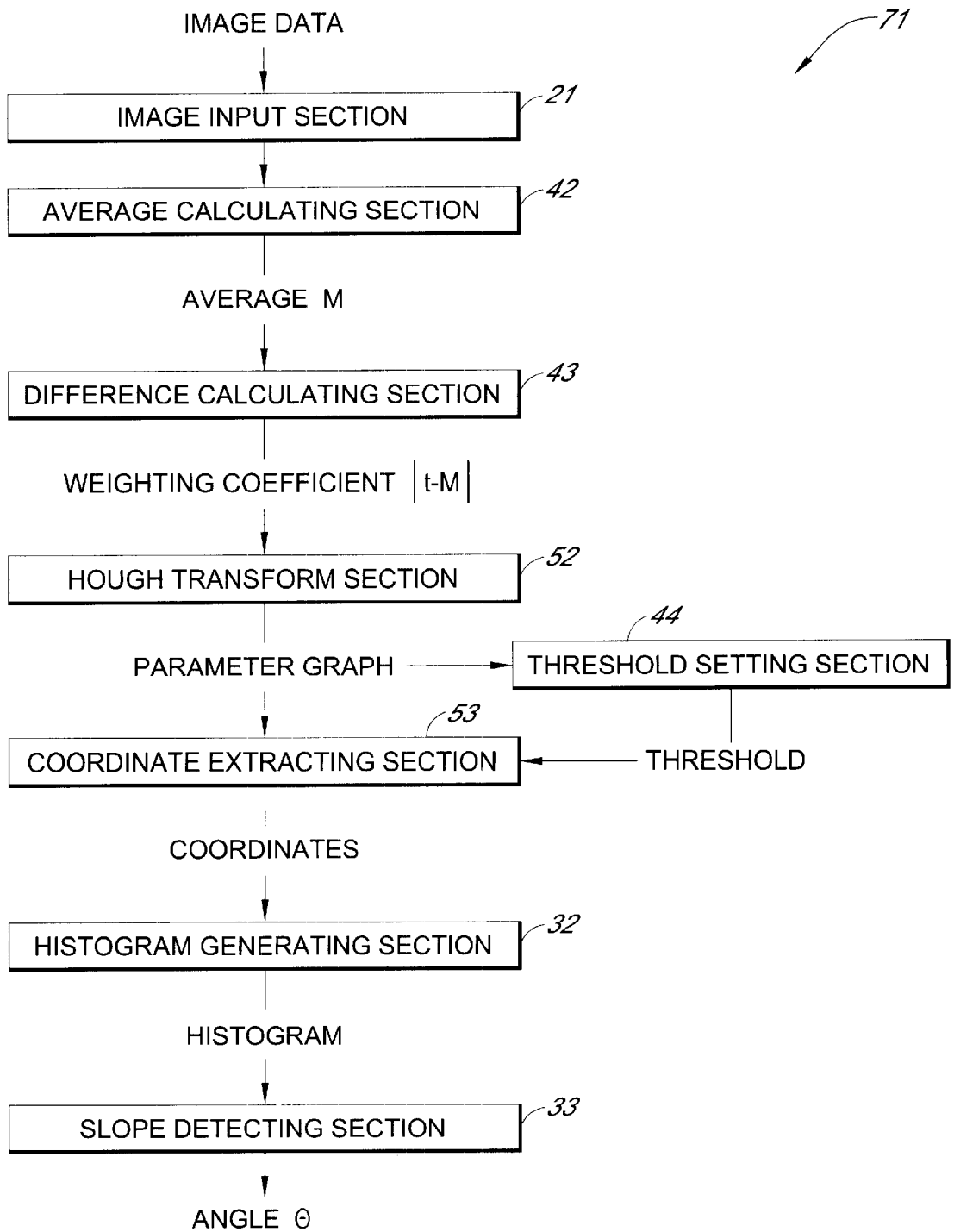
FIG. 14 is a schematic diagram showing a logical structure of essentials of a data processing apparatus of a second variation of the present invention.

Additionally, as data processing unit 71 of a second variation shown in FIG. 14, the aforementioned portions 42, 43, 52 to 54, 32, and 33 can be combined.

While preferred embodiments relate to the present invention have been described using specific terms, such description is for illustrative purposes only, and it is to be understood that changes and variations may be made without departing from the spirit or scope of the following claims.

What is claimed is:

1. A method of processing data comprising:
inputting image data comprising multiple pixels each having a multilevel value set in digital form;
Hough-transforming the inputted image data to generate a parameter plane in which multiple Hough-curves are plotted in a parameter space;
extracting a plurality of coordinates from the parameter plane;
detecting relative distances between the extracted coordinates;
grouping the extracted coordinates in the parameter plane in accordance with the detected relative distances therebetween;
selecting representative coordinates for each group; and
estimating slopes of linear components in the image data from the selected coordinates.

2. A method of processing data comprising:
inputting image data comprising multiple pixels each having a multilevel value set in digital form;
edge-processing the inputted image data to enhance values of the pixels in edge portions in the image data;
comparing each of the values of the pixels in the edge-processed image data with a predetermined threshold to convert the edge-processed image data into binary data;
Hough-transforming the binary image data to generate a parameter plane in which multiple Hough-curves are plotted in a parameter space;
comparing the number of mutually-intersected Hough-curves with a predetermined threshold and extracting from the generated parameter plane coordinates of the intersection of mutually-intersected Hough-curves, the number of which is greater than said threshold;
detecting relative distances between the extracted coordinates;
grouping the extracted coordinates in the parameter plane in accordance with the detected relative distances therebetween;
selecting representative coordinates for each group thus generated; and
estimating slopes of linear components in the image data from the selected coordinates.

3. A method of processing data comprising:
inputting image data comprising multiple pixels each having a multilevel value set in digital form;
edge-processing the inputted image data to enhance values of the pixels in edge portions in the image data;
comparing each of the values of the pixels in the edge-processed image data with a predetermined threshold to convert the edge-processed image data into binary data;
performing Hough-transform for each pixel represented with position coordinates (x, y) in the binary image data to generate a parameter plane in which multiple Hough-curves are plotted in a parameter space with coordinates (θ, ρ) thereof in which θ represents an angle with respect to an x axis and |ρ| represents a distance from an origin point to a linear component ρ=x cos θ+y sin θ;
comparing the number of mutually-intersected Hough-curves with a predetermined threshold and extracting from the generated parameter plane coordinates of the intersection of mutually-intersected Hough-curves, the number of which is greater than said threshold;
adding up the number of the extracted coordinates in the parameter plane for each angle θ to generate a histogram; and
specifying an angle θ with the maximum number of the extracted coordinates from the generated histogram.

4. The method according to claim 2, wherein said generating a parameter plane from the binary image data comprises performing the Hough-transform for each pixel represented with position coordinates (x, y) in the image data to generate a parameter plane in which multiple Hough-curves are plotted in a parameter space with coordinates (θ, ρ) thereof in which θ represents an angle with respect to an x axis and |ρ| represents a distance from an origin point to a linear component ρ=x cos θ+y sin θ, and
wherein said estimating slopes of linear components in the image data from the selected coordinates comprises specifying an angle θ with a large number of the selected coordinates are concentrated.

5. A method of processing data comprising:

inputting image data comprising multiple pixels each having a multilevel value set in digital form;

calculating the average of values of all the pixels in the inputted image data;

calculating a difference between the calculated average and a value of each pixel in the image data;

comparing the calculated difference of the value with a predetermined threshold for each pixel to convert the image data into binary data;

Hough-transforming the binary image data to generate a parameter plane in which multiple Hough-curves are plotted in a parameter space;

comparing the number of mutually-intersected Hough-curves with a predetermined threshold and extracting from the generated parameter plane coordinates of the intersection of mutually-intersected Hough-curves, the number of which is greater than said threshold;

grouping the extracted coordinates in the parameter plane in accordance with the proximity thereof;

selecting representative coordinates for each group thus generated; and estimating slopes of linear components in the image data from the selected coordinates.

6. A method of processing data comprising:

inputting image data comprising multiple pixels each having a multilevel value set in digital form;

calculating the average of values of all the pixels in the inputted image data;

calculating a difference between the calculated average and a value of each pixel in the image data;

comparing the calculated difference of the value with a predetermined threshold for each pixel to convert the image data into binary data;

performing Hough-transform for each pixel represented with position coordinates (x, y) in the binary image data to generate a parameter plane in which multiple Hough-curves are plotted in a parameter space with coordinates ($\theta$, $\rho$) thereof in which $\theta$ represents an angle with respect to an x axis and $|\rho|$ represents a distance from an origin point to a linear component $\rho = x \cos \theta + y \sin \theta$;

comparing the number of mutually-intersected Hough-curves with a predetermined threshold and extracting from the generated parameter plane coordinates of the intersection of mutually-intersected Hough-curves, the number of which is greater than said threshold;

adding up the number of the extracted coordinates in the parameter plane for each angle $\theta$ to generate a histogram; and specifying an angle $\theta$ with the maximum number of the extracted coordinates from the generated histogram.

7. The method according to claim 5, wherein said generating a parameter plane from the binary image data comprises performing the Hough-transform for each pixel represented with position coordinates (x, y) in the image data to generate a parameter plane in which multiple Hough-curves are plotted in a parameter space with coordinates ($\theta$, $\rho$) thereof in which $\theta$ represents an angle with respect to an x axis and $|\rho|$ represents a distance from an origin point to a linear component $\rho = x \cos \theta + y \sin \theta$, and wherein said estimating slopes of linear components in the image data from the selected coordinates comprises specifying an angle $\theta$ with a large number of the selected coordinates are concentrated.

8. A method of processing data comprising:

inputting image data comprising multiple pixels each having a multilevel value set in digital form;

calculating the average M of values t of all the pixels in the inputted image data;

calculating a difference $|t-M|$ between the calculated average and a value of each pixel in the image data as a weighting coefficient; and performing Hough-transform for each pixel represented with position coordinates (x, y) in the image data to generate a parameter plane in which multiple Hough-curves are plotted in a parameter space with coordinates ($\theta$, $\rho$) thereof in which $\theta$ represents an angle with respect to an x axis and $|\rho|$ represents a distance from an origin point to a linear component $\rho = x \cos \theta + y \sin \theta$ with for each mutually intersected the Hough-curves the weighting coefficient corresponding thereto added to the number of the curves thereof.

9. The method according to claim 8, further comprising:

comparing the addition result with a threshold and extracting from the parameter plane coordinates with the addition result being greater than said threshold;

grouping the extracted coordinates in the parameter plane in accordance with the proximity thereof;

selecting representative coordinates for each group thus generated; and estimating slopes of linear components in the image data from the selected coordinates.

10. The method according to claim 8, further comprising:

comparing the addition result with a threshold and extracting from the parameter plane coordinates with the addition result being greater than said threshold;

adding up the number of the extracted coordinates in the parameter plane for each angle $\theta$ to generate a histogram; and specifying an angle $\theta$ with the maximum number of the extracted coordinates from the generated histogram.

11. The method according to claim 9, wherein said estimating slopes of linear components in the image data from the selected coordinates comprises specifying an angle $\theta$ with a large number of the selected coordinates are concentrated.

12. The method according to claim 5, further comprising:

calculating a difference between the calculated average M of values of the pixels and a value of each pixel;

calculating a standard deviation $\Sigma$ from the average M of values of pixels and the difference between the average and a value of each pixel; and calculating a threshold t to convert the image data into binary data represented as "$t = M + 3\Sigma$" from the average M and the standard deviation $\Sigma$.

13. The method according to claim 6, further comprising:

calculating a difference between the calculated average M of values of the pixels and a value of each pixel;

calculating a standard deviation $\Sigma$ from the average M of values of pixels and the difference between the average and a value of each pixel; and calculating a threshold t to convert the image data into binary data represented as "$t = M + 3\Sigma$" from the average M and the standard deviation $\Sigma$.

14. The method according to claim 8, further comprising:

calculating a difference between the calculated average Mp of values for all the coordinates in the parameter plane and each value for the coordinates;

calculating a standard deviation Σ using the average Mp of values and the difference between the average and each value for the coordinates; and calculating a threshold Th to convert the image data into binary data represented as "Th=Mp+3Σ" from the average Mp and the standard deviation Σ.

15. An information storage medium comprising a program stored therein for causing a computer to perform:

inputting image data comprising multiple pixels each having a multilevel value set in digital form;

edge-processing the inputted image data to enhance values of the pixels in edge portions in the image data;

comparing each of the values of the pixels in the edge-processed image data with a predetermined threshold to convert the edge-processed image data into binary data;

Hough-transforming the binary image data to generate a parameter plane in which multiple Hough-curves are plotted in a parameter space;

comparing the number of mutually-intersected Hough-curves with a predetermined threshold and extracting from the generated parameter plane coordinates of the intersection of mutually-intersected Hough-curves, the number of which is greater than said threshold;

detecting relative distances between the extracted coordinates;

grouping the extracted coordinates in the parameter plane in accordance with the detected relative distances therebetween;

selecting representative coordinates for each group thus generated; and estimating slopes of linear components in the image data from the selected coordinates.

16. An information storage medium comprising a program stored therein for causing a computer to perform:

inputting image data comprising multiple pixels each having a multilevel value set in digital form;

edge-processing the inputted image data to enhance values of the pixels in edge portions in the image data;

comparing each of the values of the pixels in the edge-processed image data with a predetermined threshold to convert the edge-processed image data into binary data;

performing Hough-transform for each pixel represented with position coordinates (x, y) in the binary image data to generate a parameter plane in which multiple Hough-curves are plotted in a parameter space with coordinates (θ, ρ) thereof in which θ represents an angle with respect to an x axis and |ρ| represents a distance from an origin point to a linear component ρ=x cos θ+y sin θ;

comparing the number of mutually-intersected Hough-curves with a predetermined threshold and extracting from the generated parameter plane coordinates of the intersection of mutually-intersected Hough-curves, the number of which is greater than said threshold;

adding up the number of the extracted coordinates in the parameter plane for each angle θ to generate a histogram; and specifying an angle θ with the maximum number of the extracted coordinates from the generated histogram.

17. The information storage medium according to claim 15, wherein said generating a parameter plane from the binary image data comprises performing the Hough-transform for each pixel represented with position coordinates (x, y) in the binary image data to generate a parameter plane in which multiple Hough-curves are plotted in a parameter space with coordinates (θ, ρ) thereof in which θ represents an angle with respect to an x axis and |ρ| represents a distance from an origin point to a linear component ρ=x cos θ+y sin θ, and wherein said estimating slopes of linear components in the image data from the selected coordinates comprises specifying an angle θ with a large number of the selected coordinates are concentrated.

18. An information storage medium comprising a program stored therein for causing a computer to perform:

inputting image data comprising multiple pixels each having a multilevel value set in digital form;

calculating the average of values of all the pixels in the inputted image data;

calculating a difference between the calculated average and a value of each pixel in the image data;

comparing the calculated difference of the value with a predetermined threshold for each pixel to convert the image data into binary data;

Hough-transforming the binary image data to generate a parameter plane in which multiple Hough-curves are plotted in a parameter space;

comparing the number of mutually-intersected Hough-curves with a predetermined threshold and extracting from the generated parameter plane coordinates of the intersection of mutually-intersected Hough-curves, the number of which is greater than said threshold;

grouping the extracted coordinates in the parameter plane in accordance with the proximity thereof;

selecting representative coordinates for each group thus generated; and estimating slopes of linear components in the image data from the selected coordinates.

19. An information storage medium comprising a program stored therein for causing a computer to perform:

inputting image data comprising multiple pixels each having a multilevel value set in digital form;

calculating the average of values of all the pixels in the inputted image data;

calculating a difference between the calculated average and a value of each pixel in the image data;

comparing the calculated difference of the value with a predetermined threshold for each pixel to convert the image data into binary data;

performing Hough-transform for each pixel represented with position coordinates (x, y) in the binary image data to generate a parameter plane in which multiple Hough-curves are plotted in a parameter space with coordinates (θ, ρ) thereof in which θ represents an angle with respect to an x axis and |ρ| represents a distance from an origin point to a linear component ρ=x cos θ+y sin θ;

comparing the number of mutually-intersected Hough-curves with a predetermined threshold and extracting from the generated parameter plane coordinates of the intersection of mutually-intersected Hough-curves, the number of which is greater than said threshold;

adding up the number of the extracted coordinates in the parameter plane for each angle θ to generate a histogram; and specifying an angle θ with the maximum number of the extracted coordinates from the generated histogram.

20. The information storage medium according to claim 18, wherein said generating a parameter plane from the binary image data comprises performing the Hough-transform for each pixel represented with position coordinates (x, y) in the binary image data to generate a parameter plane in which multiple Hough-curves are plotted in a parameter space with coordinates (θ, ρ) thereof in which θ represents an angle with respect to an x axis and |ρ| represents a distance from an origin point to a linear component ρ=x cos θ+y sin θ, and wherein said estimating slopes of linear components in the image data from the selected coordinates comprises specifying an angle θ with a large number of the selected coordinates are concentrated.

21. An information storage medium comprising a program stored therein for causing a computer to perform:

inputting image data comprising multiple pixels each having a multilevel value set in digital form;

calculating the average M of values t of all the pixels in the inputted image data;

calculating a difference |t−M| between the calculated average and a value of each pixel in the image data as a weighting coefficient; and performing Hough-transform for each pixel represented with position coordinates (x, y) in the image data to generate a parameter plane in which multiple Hough-curves are plotted in a parameter space with coordinates (θ, ρ) thereof in which θ represents an angle with respect to an x axis and |ρ| represents a distance from an origin point to a linear component ρ=x cos θ+y sin θ with for each mutually intersected the Hough-curves the weighting coefficient corresponding thereto added to the number of the curves thereof.

22. The information storage medium according to claim 21, further comprising a program stored therein for causing said computer to perform:

extracting coordinates with a high value of the addition result from the parameter plane generated through a comparison with a predetermined threshold;

grouping the extracted coordinates in the parameter plane in accordance with the proximity thereof;

selecting representative coordinates for each group thus generated; and estimating slopes of linear components in the image data from the selected coordinates.

23. The information storage medium according to claim 21, further comprising a program stored therein for causing said computer to perform:

extracting coordinates with a high value of the addition result from the parameter plane generated through a comparison with a predetermined threshold;

adding up the number of the extracted coordinates in the parameter plane for each angle θ to generate a histogram; and specifying an angle θ with the maximum number of the extracted coordinates from the generated histogram.

24. The information storage medium according to claim 22, wherein said estimating slopes of linear components in the image data from the selected coordinates comprises specifying an angle θ with a large number of the selected coordinates are concentrated.

* * * * *